2,854,477
METHOD OF MAKING ALKYL DIPHENYL ETHER SULFONATES

Alfred F. Steinhauer, Midland, Mich., assignor to The Dow Chemical Company, Midland, Mich., a corporation of Delaware No Drawing. Application November 29, 1956
Serial No. 623,286

10 Claims. (Cl. 260—512)

This invention concerns a method of making alkyl diphenyl ether sulfonates. It relates more particularly to a method of sulfonating alkyl diphenyl ethers to form alkyl diphenyl ether sulfonates having surface active properties in aqueous solutions of strong electrolytes.

U. S. Patent No. 2,081,876 makes alkyl diphenyl ether sulfonates by condensing a sulfuric acid ester of an aliphatic or cycloaliphatic alcohol or a sulfuric acid ester of an unsaturated hydrocarbon with diphenyl ether. The patent teaches that sulfonation of the diphenyl ether nucleus can be carried out either before or after condensation with the alkyl or cycloalkyl compound or the sulfonation may be effected during the condensation and with sulfonating agents such as sulfuric acid, sulfur trioxide or chlorosulfonic acid, and in the presence or absence of an inert solvent, e. g. tetrachloroethane. The sulfonated alkyl diphenyl ethers are taught to have surface active properties which render them useful as wetting, dispersing or emulsifying agents or as detergents.

The method heretofore proposed for the preparation of alkyl diphenyl ether sulfonates has the disadvantages that unsaturated aliphatic hydrocarbons of the aliphatic series are difficult to condense with diphenyl ether in the presence of sulfuric acid to form alkyl diphenyl ether sulfonates having good surface active properties in aqueous solutions of strong electrolytes and requires large proportions of the sulfuric acid condensing agent which increases the difficulties of recovering the sulfonate product.

It has now been discovered that water-soluble alkyl diphenyl ether sulfonates having surface active properties in aqueous solutions of acids, bases or salts can readily be prepared by reacting a sulfonating agent such as chlorosulfonic acid or sulfur trioxide, with an alkylated diphenyl ether having an average of from 1 to 1.3 alkyl substituents, each corresponding to an alkyl radical containing from 9 to 15 carbon atoms, per diphenyl ether nucleus in amounts corresponding to from 1.8 to 2.3 gram molecular proportions of the sulfonating agent per gram molecular proportion of the alkylated diphenyl ether starting material while having the reactants dissolved in a liquid polychlorinated aliphatic hydrocarbon at reaction temperatures between −20° and 60° C. as hereinafter described.

The alkyl diphenyl ethers to be employed as starting materials can be an alkylated diphenyl ether having an average of from 1 to 1.3 alkyl substituents, each corresponding to an alkyl radical containing from 9 to 15 carbon atoms, on aromatic nuclei of the diphenyl ether.

The alkyl diphenyl ethers can be prepared in known ways, e. g. by reaction of unsaturated aliphatic hydrocarbons or saturated aliphatic monohalohydrocarbons with diphenyl ether in the presence of a Friedel-Crafts catalyst. The alkyl diphenyl ether starting material is preferably prepared by reacting polypropylenes such as tripropylene, tetrapropylene or pentapropylene with diphenyl ether in the presence of a Friedel-Crafts catalyst, e. g. aluminum chloride, and at temperatures between 40° and 80° C. Polypropylene fractions consisting principally of tripropylenes $C_9H_{18}$, tetrapropylenes $C_{12}H_{24}$, or pentapropylenes $C_{15}H_{30}$, are known. In general, the tripropylene fraction has a boiling range between 120° and 165° C.; the tetrapropylene fraction has a boiling range between 185° and 210° C.; and the pentapropylene fraction has a boiling range between 250° and 300° C. Such polypropylene fractions contain tripropylenes, tetrapropylenes and pentapropylenes, respectively, as the major or principal component. They are normally produced by the superatmospheric polymerization of propylene in the presence of a Friedel-Crafts type catalyst, e. g. boron trifluoride or aluminum chloride, and are available commercially.

The sulfonating agent can be chlorosulfonic acid or sulfur trioxide, preferably the latter, and can be used in amounts corresponding to from 1.8 to 3, suitably from 2 to 2.3, gram molecular proportions of the sulfonating agent per gram molecular proportion of the alkyl diphenyl ether initially employed.

It is important that the sulfonated alkyl diphenyl ether product contain alkyl substituents and sulfonate groups, i. e. —$SO_3H$ or $SO_3M$ groups wherein M is a monovalent alkali such as ammonium or an alkali metal, in amounts corresponding to from 1 to 1.3 alkyl substituents each corresponding to an alkyl radical containing from 9 to 15 carbon atoms, e. g. a tripropylene, a tetrapropylene or a pentapropylene radical, and from 1.8, preferably from 2 to 2.3, sulfonate groups per diphenyl ether nucleus, in order to obtain products having good surface active properties in aqueous solutions of acids, bases or salts. The number of alkyl substituents can be controlled by the relative proportions of the polypropylene and diphenyl ether reactants employed in the alkylation reaction. The number of sulfonate groups can be controlled by the proportion of the sulfonating agent employed relative to the alkyl diphenyl ether starting material used.

The term "sulfonate" employed herein pertains to the alkyl diphenyl ether sulfonic acid and salts thereof, particularly alkali salts such as sodium or potassium salts of the alkyl diphenyl ether sulfonic acid.

The sulfonation reaction which occurs readily at room temperature or thereabout is carried out while having the reactants dissolved in a liquid polychlorinated aliphatic hydrocarbon such as methylene chloride, carbon tetrachloride, perchloroethylene, sym-tetrachloroethane or ethylene dichloride, and in amounts corresponding to a concentration of from 2 to 45, preferably from 2 to 20, percent by weight of the reactants, based on the combined weight of the reactants and the polychlorinated aliphatic hydrocarbon. The reactants and the liquid polychlorinated aliphatic hydrocarbon, preferably methylene chloride, are employed in amounts sufficient to form a mobile solution or slurry which can readily be stirred or pumped through pipes or tubular conduits. The sulfonating reaction can be carried out at temperatures between −20° and 60° C., preferably from 20° to 40° C., and at atmospheric, subatmospheric or superatmospheric pressure. The sulfonating reaction is preferably carried out at atmospheric or superatmospheric pressures of from 1 to 10 pounds per square inch gauge pressure.

Upon completing the sulfonating reaction, the alkyl diphenyl ether sulfonic acid is usually converted to a corresponding alkali salt by mixing the polychlorinated aliphatic hydrocarbon reaction medium containing the alkyl diphenyl ether sulfonic acid with water and adding an alkali such as sodium hydroxide or potassium hydroxide, in amount sufficient to bring the aqueous solution or slurry to a pH value between 7 and 8 and allowing the mixture to stand whereupon it usually separates into an aqueous and an organic layer. The aqueous layer is separated and can be dried by evaporating the water in usual ways, e. g. by spray drying or by drying on heated rolls, to recover the alkyl diphenyl ether sulfonate in flake, granular or powdered form. The product is usually obtained as a white to tan colored free-flowing powder containing from 75 to 95 percent by weight of the alkyl diphenyl ether sulfonate in admixture with small amounts of alkali sulphate, alkali chloride and water.

The sulfonating reaction can be carried out batchwise or in continuous manner. In a batchwise process, the alkyl diphenyl ether is placed in a reaction vessel together with a polychlorinated aliphatic hydrocarbon, suitably methylene chloride, as reaction medium. The mixture is stirred and chlorosulfonic acid or sulfur trioxide, preferably the latter, diluted with liquid reaction medium is added in the desired proportion and at about the rate it is consumed in the reaction while maintaining the resulting mixture at reaction temperatures between −20° and 60° C., preferably at from 20° to 40° C. and at atmospheric pressure or thereabout. Thereafter, the reacted mixture is mixed with water and an alkali, preferably sodium hydroxide, is added in amount sufficient to neutralize the alkyl diphenyl ether sulfonic acid and form the corresponding salt. The aqueous layer is separated from the organic reaction medium and is dried by evaporating the water to recover the product.

The sulfonating reaction can be carried out in continuous manner by feeding the alkyl diphenyl ether and the sulfonating agent, preferably sulfur trioxide, into admixture with one another in the desired proportions in a liquid reaction medium such as methylene chloride in a reaction zone wherein they are maintained at temperatures between −20° and 60° C. for a reaction time of from 2 to 900 seconds. The reacted material is withdrawn, mixed with water and an alkali added to form the corresponding alkyl diphenyl ether sulfonic acid salt and the latter recovered from the aqueous solution by evaporating the water in usual ways.

The alkyl diphenyl ether sulfonates, particularly the alkali metal salts of the alkyl diphenyl ether sulfonic acids, prepared according to the invention are all soluble in water and in aqueous solutions of acids, bases or salts. The sodium salts of the alkyl diphenyl ether sulfonic acids can be dissolved in an aqueous solution containing 10 percent by weight of sodium hydroxide to form clear solutions containing 10 grams of said product in 100 grams of the solution. The alkyl diphenyl ether sulfonates are surface active agents and exhibit surface active properties in aqueous solutions of strong electrolytes such as acids, bases and salts. They are useful as wetting agents, emulsifying agents or detergents.

The following examples illustrate ways in which the principle of the invention has been applied, but are not to be construed as limiting its scope.

EXAMPLE 1

A charge of 680 grams (4 moles) of diphenyl ether having the formula $C_6H_5 \cdot O \cdot C_6H_5$, was placed in a glass reaction vessel equipped with a reflux condenser and stirrer. A charge of 36 grams of powdered anhydrous aluminum chloride was added. The mixture was heated to a temperature of 60° C. and stirred. Thereafter, 340 grams of polypropylenes boiling at temperatures between 185° and 210° C. and consisting of tetrapropylene, $C_{12}H_{24}$, as the principal component was added over a period of 1.5 hours while stirring and maintaining the resulting mixture at temperatures between 60° and 70° C. The reacted mixture was stirred and maintained at 60°–70° C. for 2 hours longer. Thereafter, the mixture was washed twice with water to remove the aluminum chloride. The aqueous washings were discarded. The organic layer was dried and distilled. There were obtained 382 grams of unreacted diphenyl ether and 563 grams of alkylated diphenyl ether product as a light yellow colored liquid boiling at temperatures of from 164° to 247° C. at one millimeter absolute pressure. The alkylated diphenyl ether product contained an average of 1.15 alkyl radicals corresponding to tetrapropyl ($C_{12}H_{25}$) radicals per diphenyl ether nucleus.

EXAMPLE 2

A charge of 67.6 grams of the alkylated diphenyl ether boiling at 164°–247° C. at one millimeter absolute pressure, prepared in Example 1, was placed in a glass reaction vessel equipped with a reflux condenser and stirrer, together with 730 grams of methylene chloride as solvent. The solution was stirred. A charge of 32 grams of sulfur trioxide dissolved in 266 grams of methylene chloride was added over a period of 15 minutes while maintaining the resulting mixture at temperatures between 25° and 27° C. The mixture was stirred for 15 minutes longer, then was mixed with 350 grams of water. The resulting mixture was neutralized by adding 32.7 grams of an aqueous 50 weight percent solution of sodium hydroxide. The alkyl diphenyl ether sulfonic acid, sodium salt, precipitated to form a slurry. The product was recovered by spreading a thin layer of the slurry on the surface of a heated roll, evaporating the water, together with the methylene chloride, and scraping the dried solid product from the roll. The product was a free flowing powder. It contained an average of two sulfonate groups ($-SO_3Na$) per diphenyl ether nucleus. The product was soluble in water and aqueous solutions of salts and bases. Ten parts by weight of the product dissolved in 100 parts of an aqueous 10 weight percent solution of sodium hydroxide to form a clear solution. The product had surface active properties both in water and in solutions of strong electrolytes. Surface active properties were determined for aqueous solutions of 10 weight percent sodium hydroxide, 10 weight percent calcium chloride and 10 weight percent sodium sulfate, containing 0.1 percent by weight of the product. The procedure for determining the amount of foam was similar to the Ross-Miles foam test. The wetting time was determined by procedure similar to the Draves-Clarkson sinking time test. Surface tension was determined employing a standard tensiometer. The results are reported in Table I.

*Table I*

| Run No. | Aqueous Solution, Kind | Foam Height, mm. | Wetting Time, min. | Surface Tension, dynes/sq. cm. |
|---|---|---|---|---|
| 1 | 10 percent Sodium Hydroxide | 5 | 2.2 | 32.1 |
| 2 | 10 percent Calcium Chloride | | 1.3 | |
| 3 | 10 percent Sodium Sulfate | | 2.0 | |

EXAMPLE 3

A mixture of 170 grams (1 mole) of diphenyl ether and 13.4 grams (0.1 mole) of anhydrous aluminum chloride was placed in a glass reaction vessel and heated to a temperature of 60° C. Thereafter, 249 grams (1 mole) of dodecyl bromide was added over a period of about 30 minutes while stirring and maintaining the resulting mixture at a temperature of 60° C. Stirring and heating of the mixture at 60° C. was continued for a period of 4 hours longer. The reacted material was washed twice, each time with an equal volume of water, and the aqueous and organic layers separated. The organic layer was distilled to recover the alkylated product. There was obtained 222.8 grams of alkylated diphenyl ether as a pale yellow liquid boiling at temperatures between 180° and 250° C. at 0.1 millimeter absolute pressure. The product consisted of a mixture of 65.6 percent by weight of monododecyl diphenyl ether and 34.4 percent of didodecyl diphenyl ether. It contained an average of 1.27 dodecyl radicals per diphenyl ether nucleus.

A charge of 106.5 grams of the dodecyl diphenyl ether product boiling at 180°–250° C. at 0.1 millimeter, prepared above, was placed in a glass reaction vessel equipped with a reflux condenser and stirrer, together with 532 grams of methylene chloride. The solution was stirred. A solution of 173 grams of methylene chloride containing 50.4 grams (0.63 mole) of sulfur trioxide was added gradually while maintaining the resulting mixture at temperatures between 25° and 30° C. Thereafter, 800 ml. of water was added. The resulting aqueous mixture was neutralized with aqueous 50 weight percent sodium hydroxide solution. The resulting mixture was a slurry of water, methylene chloride and dodecyl diphenyl ether sulfonic acid sodium salt. The slurry was dried by heating the same to evaporate the water, together with the methylene chloride and recover the dodecyl diphenyl ether sulfonate. The product was obtained as a light yellow powder. The product was analyzed and found to consist of 92.72 percent by weight of dodecyl diphenyl ether sulfonate, 2.03 percent of sodium sulfate, 0.55 percent of sodium chloride and 4.70 percent of water. The dodecyl diphenyl ether sulfonate contained an average of 1.27 dodecyl groups and 2.14 sulfonate groups ($-SO_3Na$) per diphenyl ether nucleus. The product was soluble in water. Ten grams of the product dissolved in 90 grams of water to form a clear yellow solution. The product is a surface active agent. Ten grams of the product was dissolved in 90 grams of aqueous 10 weight percent sodium hydroxide solution. The resulting solution was clear. The product is soluble in strong aqueous solution of electrolytes such as 15 percent hydrochloric acid solution and 20 percent aqueous calcium chloride solution, and has surface active properties in strong aqueous solutions of electrolytes. Surface active properties for the product were determined on aqueous solutions as defined in the following table containing 0.1 percent by weight of the product. Surface tension was determined employing a standard tensiometer. The procedure for determining the wetting time was similar to the Draves-Clarkson sinking time test. Table II identifies the aqueous solution of the electrolyte employed in the experiments and gives the surface active properties for the product in the solution.

Table II

| Run No. | Aqueous Solution, Kind | Dodecyl Diphenyl Ether Sulfonate, percent | Surface Tension, dynes/ sq. cm. | Wetting Time, min. |
|---|---|---|---|---|
| 1 | 10 percent NaOH | 0.1 | 31.3 | 3.1 |
| 2 | 15 percent HCl | 0.1 | 28.7 | 0.9 |
| 3 | 20 percent CaCl₂ | 0.1 | 32.2 | 3.7 |

EXAMPLE 4

A charge of 640 grams (4 moles) of diphenyl ether was alkylated by reacting the same with 340 grams of a polypropylene fraction boiling at temperatures between 185° and 210° C. employing procedure similar to that described in Example 1. The product was fractionally distilled. There were obtained 480 grams of an alkylated diphenyl ether fraction boiling at temperatures between 150° and 210° C. at one millimeter absolute pressure and 80 grams of a higher alkylated diphenyl ether fraction boiling at temperatures between 210° and 262° C. at one millimeter. The fraction of alkylated diphenyl ether boiling at 150°–210° C. at one millimeter absolute pressure contained approximately one alkyl substituent corresponding to a tetrapropyl ($-C_{12}H_{25}$) or dodecyl radical per diphenyl ether nucleus. The fraction of alkylated diphenyl ether boiling at 210°–262° C. at one millimeter contained approximately two alkyl substituents corresponding to tetrapropyl or dodecyl radicals per diphenyl ether nucleus.

In each of a series of experiments, a charge of 60 grams of the monododecyl diphenyl ether or a mixture of the mono and didodecyl diphenyl ether in proportions as stated in the following table was placed in a glass reaction vessel equipped with a reflux condenser and stirrer and a charge of 665 grams of methylene chloride added as solvent and reaction medium. Thereafter, a solution of 43.2 grams of sulfur trioxide dissolved in 266 grams of methylene chloride was added with stirring over a period of about 15 minutes while maintaining the resulting mixture at temperatures between 20° and 27° C. After addition of the sulfur trioxide solution, 310 grams of water was added followed by sufficient 50 weight percent aqueous sodium hydroxide solution to bring the resulting slurry to a pH value of 8. The mixture was allowed to stand whereupon it separated into an aqueous upper layer and a lower methylene chloride layer. The layers were separated. The aqueous layer containing the alkylated diphenyl ether sulfonate was dried by spreading a thin layer of the solution on the surface of a heated roll, evaporating the water and scraping the dried product from the roll. The product was obtained as a powder consisting principally of alkylated diphenyl ether sulfonic acid, sodium salt, together with sodium sulfate and a small amount of water. Table III identifies the experiments by giving the proportions of mono- and di-dodecyl diphenyl ether employed in making the sulfonated product and gives the percent by weight of water, sodium sulfate and alkylated diphenyl ether sulfonate in the dried product. The table also gives the average number of dodecyl radicals and sulfonate groups ($-SO_3Na$) per diphenyl ether nucleus as determined by analysis.

Table III

| Run No. | Starting Material—Dodecyl Diphenyl Ether | | | Product | | | |
|---|---|---|---|---|---|---|---|
| | Mono-, percent | Di-, percent | Average number of dodecyl groups per diphenyl ether nucleus | Dodecyl Diphenyl Ether Sulfonate, percent | NaSO₄, percent | Water, percent | Average number of dodecyl groups per diphenyl ether nucleus |
| 1 | 100 | 0 | 1 | 79.27 | 18.50 | 4.23 | 2.08 |
| 2 | 90 | 10 | 1.07 | 77.20 | 19.16 | 3.64 | 2.23 |
| 3 | 80 | 20 | 1.14 | 76.85 | 19.11 | 4.04 | 2.30 |
| 4 | 75 | 25 | 1.18 | 75.99 | 20.57 | 3.44 | 2.29 |
| 5 | 60 | 40 | 1.30 | 75.70 | 19.74 | 4.56 | 2.29 |

All of the products were soluble in water and in aqueous solutions of acids, bases or salts. The products are surface active agents and exhibit surface active properties both in water and in aqueous solution of electrolytes. In a series of tests for determining the solubility of the products in an aqueous solution of sodium hydroxide, 10 grams of the product was dissolved in 90 grams of aqueous 10 weight percent sodium hydroxide to form a clear solution. Surface active properties for the product were determined by dissolving an amount of the dried product in water or in an aqueous solution of an electrolyte as stated in the following table to form a solution containing 0.1 percent by weight of the dried product. Surface tension of the resulting solution was determined by a standard tensiometer. The procedure for determining a wetting time for the solution was similar to the Draves-Clarkson sinking time test. Table IV identifies the experiments and names the aqueous solutions employed in the tests. The table gives the surface active properties for the product in the solution. For brevity in the table the terms 1a, 2a, 3a, 4a, and 5a are employed to designate the alkyl diphenyl ether sulfonate product corresponding to run Nos. 1–5, respectively, given in Table III.

Table IV

| Run No. | Aqueous Solution, Kind | Alkyl diphenyl ether sulfonate | | Surface tension, dynes/sq. cm. | Wetting Time, min. |
|---|---|---|---|---|---|
| | | No. | Percent | | |
| 1 | Water | 1a | 0.1 | 33.7 | 6.7 |
| 2 | 10 percent NaOH | 1a | 0.1 | 39.8 | 2.1 |
| 3 | 15 percent HCl | 1a | 0.1 | 34.1 | 0.9 |
| 4 | 20 percent CaCl₂ | 1a | 0.1 | 35.9 | 2.3 |
| 5 | Water | 2a | 0.1 | 30.0 | 2.5 |
| 6 | 10 percent NaOH | 2a | 0.1 | 36.0 | 2.1 |
| 7 | 15 percent HCl | 2a | 0.1 | 30.0 | 0.8 |
| 8 | 20 percent CaCl₂ | 2a | 0.1 | 32.6 | 2.9 |
| 9 | Water | 3a | 0.1 | 26.6 | 2.1 |
| 10 | 10 percent NaOH | 3a | 0.1 | 34.5 | 2.1 |
| 11 | 15 percent HCl | 3a | 0.1 | 29.6 | 1.0 |
| 12 | 20 percent CaCl₂ | 3a | 0.1 | 30.2 | 3.3 |
| 13 | 10 percent NaOH | 4a | 0.1 | 30.7 | 2.5 |
| 14 | 15 percent HCl | 4a | 0.1 | 30.3 | 1.0 |
| 15 | 20 percent CaCl₂ | 4a | 0.1 | 29.4 | 4.4 |
| 16 | 10 percent NaOH | 5a | 0.1 | 32.1 | 1.8 |

EXAMPLE 5

A charge of 33.8 grams (0.093 mole) of dodecyl diphenyl ether having an average of 1.14 dodecyl groups per diphenyl ether nucleus and 275 ml. of methylene chloride was placed in a glass reaction vessel equipped with a reflux condenser and stirrer. The dodecyl diphenyl ether employed in the experiment was prepared by reacting a tetrapropylene fraction with diphenyl ether employing procedure similar to that employed in Example 1 and recovering the alkylated product. The solution of the dodecyl diphenyl ether and methylene chloride was stirred and cooled to a temperature of −20° C. Thereafter, a charge of 18.4 grams (0.23 mole) of sulfur trioxide dissolved in 100 ml. of methylene chloride was added over a period of 28 minutes while maintaining the resulting mixture at temperatures between −16° and −23° C. Stirring of the mixture was continued for a period of 15 minutes after all of the sulfur trioxide solution was added. A charge of 350 ml. of water was added with stirring and the resulting mixture neutralized to a pH value of 7.7 with 50 percent aqueous sodium hydroxide solution. The resulting mixture was dried by spreading a thin layer of the same on heated laboratory rolls, evaporating the water, together with methylene chloride, and scraping the dried product from the rolls. There was obtained 43 grams of product as a finely divided free-flowing powder consisting principally of dodecyl diphenyl ether sulfonate. One percent by weight of the product dissolved in 10 grams of an aqueous solution containing 10 percent by weight of sodium hydroxide to form a clear solution. The product has surface active properties in aqueous solutions of strong electrolytes.

EXAMPLE 6

A charge of 33.8 grams (0.093 mole) of dodecyl diphenyl ether similar to that employed in Example 5 and 100 ml. of methylene chloride was placed in a dropping funnel connected to a reaction vessel equipped with a reflux condenser and stirrer and containing 175 ml. of methylene chloride. A charge of 34.8 grams (0.3 mole) of chlorosulfonic acid and 100 ml. of methylene chloride was placed in another dropping funnel connected to the reaction vessel. The methylene chloride in the reaction vessel was stirred. The dodecyl diphenyl ether solution and the chlorosulfonic acid solution were concurrently fed into admixture with one another in the reaction vessel over a period of 35 minutes while maintaining the resulting mixture at temperatures between 23° and 28° C. Stirring of the mixture was continued for a period of 15 minutes after the reactants were added. Hydrogen chloride formed in the reaction was vented through the reflux condenser. Upon completing the reaction a charge of 350 ml. of water was added. The resulting mixture was neutralized with an aqueous 40 weight percent solution of sodium hydroxide to a pH value of 8. The mixture was allowed to stand whereupon it separated into an aqueous and an organic layer. The layers were separated. The aqueous layer was dried to recover the product. There was obtained 54 grams of product as a light yellow colored powder consisting principally of dodecyl diphenyl ether sulfonate containing an average of 1.14 dodecyl groups and 2 sulfonate groups (—SO₃Na) per diphenyl ether nucleus. One percent by weight of the product dissolved in 10 grams of an aqueous solution containing 10 percent by weight of sodium hydroxide to form a clear solution. Surface active properties for the product were determined employing procedures similar to those employed in Example 1 for aqueous solutions of strong electrolytes containing 0.1 percent by weight of the product. The results are reported in Table V.

Table V

| Run No. | Aqueous Solution, Kind | Wetting Time, Min. | Surface Tension, dynes/sq. cm. |
|---|---|---|---|
| 1 | 10% NaOH | 2 | 33.13 |
| 2 | 15% HCl | 1 | 27.25 |
| 3 | 20% CaCl₂ | 3.9 | 32.19 |

EXAMPLE 7

A charge of 33.8 grams (0.093 mole) of dodecyl diphenyl ether similar to that employed in Example 5 and 70 ml. of methylene chloride was placed in a glass reaction vessel equipped with a reflux condenser and stirrer. The mixture was stirred and maintained at temperatures between 23° and 28° C. while adding 24 grams (0.3 mole) of gaseous sulfur trioxide to the liquid over a period of one hour. Stirring was continued for a period of 15 minutes after addition of the SO₃. A charge of 300 ml. of water was added. The resulting mixture was neutralized with an aqueous 50 weight percent sodium hydroxide solution. The neutralized mixture was dried to recover the product. There was obtained 48 grams of product as a yellow colored powder consisting principally of dodecyl diphenyl ether sulfonate containing an average of 1.14 dodecyl groups and 2 sulfonate (—SO₃Na) groups per diphenyl ether nucleus. One percent by weight of the product dissolved in 10 grams of an aqueous 10 percent by weight solution of sodium hydroxide to form a clear solution. The product is a surface active agent.

EXAMPLE 8

A charge of 640 grams (4 moles) of diphenyl ether and 53.4 grams of anhydrous aluminum chloride was placed in a glass reaction vessel equipped with a reflux condenser and stirrer. The mixture was stirred and heated to a temperature of 40° C. Thereafter, 840 grams of polypropylenes boiling at temperatures between 250° and 300° C. and consisting principally of pentapropylenes $C_{15}H_{30}$ was added over a period of 0.5 hour while bubbling gaseous HCl into the mixture which was maintained at temperatures between 30° and 40° C. The mixture was stirred for 0.5 hour after addition of the polypropylenes then was washed with water to remove the catalyst and was distilled. There were obtained 311 grams of unreacted diphenyl ether, 435 grams of a mono-(pentapropyl)diphenyl ether fraction boiling at temperatures between 165° and 205° C. at 0.2 millimeter absolute pressure and 368 grams of a higher pentapropylated diphenyl ether fraction, principally di-(pentapropyl)diphenyl ether, boiling at temperatures between 205° and 265° C. at 0.2 millimeter.

A charge of 190 grams of the mono-(pentapropyl)diphenyl ether boiling at 165°–205° C. at 0.2 millimeter was placed in a glass reaction flask equipped with a reflux condenser and stirrer. A charge of 2660 grams of methylene chloride was added. The solution was stirred. A solution of 2000 grams of methylene chloride containing 100 grams of sulfur trioxide was added over a period of about 0.5 hour while maintaining the temperature of the resulting mixture between 20° and 27° C. Thereafter, 1000 grams of water was added. The aqueous mixture was neutralized with 50 weight percent aqueous sodium hydroxide solution. The resulting slurry was dried by evaporating the water and methylene chloride to recover the product. The product was a light yellow powder consisting of 89.16 percent by weight of mono-(pentapropyl)diphenyl ether sulfonate, 7.90 percent of sodium sulfate, 0.19 percent of sodium chloride and 4.75 percent of water. The product was soluble in water and in aqueous 10 weight percent sodium hydroxide solution. Ten grams of the product dissolved in 90 grams of 10 percent aqueous sodium hydroxide solution to form a clear solution. The mono-(pentapropyl)diphenyl ether sulfonate contained an average of 2.17 sulfonate (—$SO_3Na$) groups per diphenyl ether nucleus. The product is a surface active agent and has surface active properties in water and strong aqueous solutions of acids, bases or salts. Surface active properties were determined for the product employing procedures similar to those employed in Example 1. The product had surface active properties as reported in Table VI.

*Table VI*

| Run No. | Aqueous Solution, Kind | Alkyl diphenyl ether sulfonate, percent | Surface Tension, dynes/ sq. cm. | Wetting Time, Min. |
|---|---|---|---|---|
| 1 | 10% NaOH | 0.1 | 33.1 | 2.0 |
| 2 | 15% HCl | 0.1 | 28.9 | 0.5 |
| 3 | 20% CaCl$_2$ | 0.1 | 31.3 | 2.3 |

EXAMPLE 9

A charge of 33.8 grams of alkylated diphenyl ether boiling at temperatures between 185° and 245° C. at 8 millimeters absolute pressure, having a viscosity of 205 centipoises at 25° C., and containing alkyl substituents corresponding to 1.2 tetrapropyl radicals per diphenyl ether nucleus and prepared by procedure similar to that described in Example 1, was placed in a glass reaction vessel equipped with a reflux condenser and stirrer. A charge of 366 grams of perchloroethylene was added. The solution was stirred. A solution of 133 grams of perchloroethylene containing 20 grams of sulfur trioxide was added over a period of 0.5 hour while maintaining the resulting mixture at temperatures between 24° and 26° C. The mixture was stirred for 15 minutes longer. A charge of 350 grams of water was added. The resulting aqueous mixture was made neutral with aqueous 50 weight percent sodium hydroxide solution. The aqueous layer was separated and the water evaporated to recover the product. The product was a light colored powder consisting principally of dodecyl diphenyl ether sulfonate having alkyl substituents corresponding to 1.2 dodecyl radicals and sulfonate groups corresponding to two —$SO_3Na$ groups per diphenyl ether nucleus. The product is a surface active agent.

EXAMPLE 10

A charge of 1360 grams of diphenyl ether and 64 grams of anhydrous aluminum chloride was placed in a glass reaction vessel equipped with a reflux condenser and stirrer. The mixture was stirred and heated to a temperature of 50° C. Thereafter, 504 grams of polypropylenes boiling at temperatures between 120° and 165° C. and consisting of tripropylenes as the principal component was added over a period of one hour. The mixture was stirred for two hours longer. It was cooled, diluted with an equal volume of methylene chloride and washed twice with water. The aqueous washings were discarded. The organic layer was distilled to recover the alkylated diphenyl ether product. There was obtained 139 grams of mono-(tripropyl)diphenyl ether boiling at temperatures between 140° and 154° C. at 2 millimeters absolute pressure.

A charge of 33.8 grams of the mono-(tripropyl)-diphenyl ether boiling at 140°–154° C. at 2 millimeters, together with 332 grams of methylene chloride was placed in a glass reaction vessel equipped with a reflux condenser and stirrer. The solution was stirred and a solution of 133 grams of methylene chloride containing 18 grams of sulfur trioxide was added over a period of 20 minutes while maintaining the temperature of the resulting mixture between 25° and 27° C. Upon completion of the sulfonating reaction, 300 grams of water was added. The resulting aqueous mixture was neutralized with aqueous 50 weight percent sodium hydroxide and the aqueous and organic layers separated. The aqueous layer was evaporated to recover the product. The product was obtained as a light yellow powder consisting of 89.97 percent by weight of mono-(tripropyl)diphenyl ether sulfonate containing 1.8 sulfonate (—$SO_3Na$) groups per diphenyl ether nucleus, 5.76 percent of sodium sulfate, 0.17 percent of sodium chloride and 4.10 percent water. The product is a surface active agent. It dissolved in water and in aqueous 10 percent sodium hydroxide solution to form clear solutions containing 10 percent by weight of the product. Surface active properties for the product were determined employing procedures similar to those employed in Example 1. The surface active properties for the product in aqueous solutions of acids, bases and salts are reported in Table VII.

*Table VII*

| Run No. | Aqueous Solution, Kind | Alkyl diphenyl ether sulfonate, percent | Surface Tension, dynes/ sq. cm. | Wetting Time, Min. |
|---|---|---|---|---|
| 1 | 10% NaOH | 0.1 | 30.4 | 2.1 |
| 2 | 15% HCl | 0.1 | 27.1 | 1.4 |
| 3 | 20% CaCl$_2$ | 0.1 | 28.8 | 2.9 |
| 4 | water | 0.1 | 29.6 | 0.7 |

EXAMPLE 11

A charge of 180 pounds of diphenyl ether and 9.4 pounds of anhydrous aluminum chloride was placed in a reaction vessel equipped with a stirrer and means for heating or cooling the contents. The mixture was heated to a temperature of 80° C. and stirred. A charge of 119 pounds of polypropylenes boiling at temperatures between 185° and 210° C. and consisting principally of tetrapropylenes was added over a period of 4 hours, together with 0.5 pounds of anhydrous hydrogen chloride. Upon completing the alkylation reaction, the reacted mixture was washed twice, each with a 35 gallon portion of water, to remove the aluminum chloride catalyst residue. The organic layer was distilled. There were obtained 188 pounds of unreacted diphenyl ether and 241 pounds of alkylated diphenyl ether as a pale yellow colored liquid boiling at temperatures between 184° and 245° C. at 8 millimeters absolute pressure and having an absolute viscosity of 207 centipoises at 25° C. and a refractive index $n_D^{25}$ 1.5259. The product contained alkyl substituents corresponding to 1.2 dodecyl radicals per diphenyl ether nucleus. The alkylated diphenyl ether product was fed at a rate of 18 pounds per hour into a stream of methylene chloride at a temperature of −20° C. and flowing at a rate of 256 pounds per hour, which resulting solution was fed to a reaction zone and into admixture with a stream of liquid sulfur trioxide fed thereto at a rate of 8.5 pounds per hour under a pressure of 30 pounds per square inch gauge pressure and at a temperature of 60° C. The mixture of ingredients was held in the reaction zone for a reaction time of about 2 seconds then was discharged at temperatures between 41° and 43° C. By "reaction time" is meant the time required for an infinitesimal portion of the mixture of ingredients to pass through the reaction zone. The sulfonation reaction occurred immediately upon mixing of the reactants. The reacted material discharged from the reaction zone was immediately mixed with an equal volume of water and the aqueous mixture neutralized with an aqueous 50 weight percent solution of sodium hydroxide. The resulting mixture was passed to a separating zone wherein the aqueous and organic layers were allowed to separate. The organic layer which was principally methylene chloride was separated and reused in the sulfonation reaction. The aqueous layer containing the alkylated diphenyl ether sulfonate product was separated and spray dried to evaporate the water and recover the product. The product was obtained as a light yellow powder. It was analyzed and found to consist of:

| Ingredient: | Percent |
|---|---|
| Dodecyl diphenyl ether sulfonate | 89.77 |
| Water | 1.97 |
| $Na_2SO_4$ | 3.46 |
| NaCl | 4.80 |

The product contained 1.95 sulfonate ($-SO_3Na$) groups per diphenyl ether nucleus. It was soluble in water. Ten grams of the product dissolved in 90 grams of water at 25° C. to form a clear light colored solution. Surface active properties for the product were determined on aqueous solutions containing 0.1 percent by weight of the product. Surface tension was determined employing a standard tensiometer. The wetting time was determined employing procedure similar to the Draves-Clarkson sinking time test. Table VIII identifies the aqueous solutions employed in the test and gives the surface active properties of the alkyl diphenyl oxide sulfonate product in said solutions.

Table VIII

| Run No. | Aqueous Solution, Kind | Surface Tension, dynes/sq. cm. | Wetting Time, Min. |
|---|---|---|---|
| 1 | water | 31.0 | 0.9 |
| 2 | 10% NaOH | 32.7 | 1.8 |
| 3 | 10% $Na_4SiO_4$ | 34.0 | 3.2 |
| 4 | 15% HCl | 29.7 | 0.6 |
| 5 | 20% $CaCl_2$ | 33.2 | 2.3 |

I claim:

1. A method of making an alkyl diphenyl ether sulfonate, which method comprises reacting a sulfonating agent selected from the group consisting of sulfur trioxide and chlorosulfonic acid, with at least one alkylated diphenyl ether having an average of from 1 to 1.3 alkyl substituents, each corresponding to an alkyl radical containing from 9 to 15 carbon atoms, on aromatic nuclei thereof, in amounts corresponding to from 1.8 to 2.3 gram molecular proportions of the sulfonating agent per gram molecular equivalent disphenyl ether nucleus, while having the reactants dissolved in a liquid polychlorinated aliphatic hydrocarbon selected from the group consisting of methylene chloride, carbon tetrachloride, perchloroethylene, sym-tetrachloroethane and ethylene dichloride, in a total concentration of the reactants of from 2 to 45 percent by weight of the solution and at reaction temperatures between −20° and 60° C. and separating the resulting alkyl diphenyl ether sulfonate from the polychlorinated aliphatic hydrocarbon.

2. A method of making a water-soluble alkyl diphenyl ether sulfonate having surface active properties in aqueous solutions of acids, bases and salts, which method comprises reacting a sulfonating agent selected from the group consisting of sulfur trioxide and chlorosulfonic acid, with at least one alkylated diphenyl ether containing an average of from 1 to 1.3 alkyl substituents, each corresponding to an alkyl radical containing from 9 to 15 carbon atoms, on aromatic nuclei thereof, in amounts corresponding to from 1.8 to 2.3 gram molecular proportions of the sulfonating agent per gram molecular equivalent diphenyl ether nucleus while having the reactants dissolved in a liquid polychlorinated aliphatic hydrocarbon selected from the group consisting of methylene chloride, carbon tetrachloride, perchloroethylene, sym-tetrachloroethane and ethylene chloride, in a total concentration of the reactants of from 2 to 20 percent by weight of the solution and at reaction temperatures between −20° and 60° C., neutralizing the resulting alkyl diphenyl ether sulfonic acid with an alkali metal hydroxide to form a corresponding alkyl diphenyl ether sulfonate and separating the sulfonate from the polychlorinated aliphatic hydrocarbon.

3. A method as claimed in claim 2, wherein the reaction of the sulfonating agent with the alkylated diphenyl ether is carried out in continuous manner and at reaction temperatures between −20° and 60°C.

4. A method as claimed in claim 2, wherein the sulfonating agent is sulfur trioxide.

5. A method as claimed in claim 2, wherein the alkylated diphenyl ether contains alkyl substituents derived from polypropylenes containing from 9 to 15 carbon atoms.

6. A method as claimed in claim 5, wherein the alkylated diphenyl ether contains alkyl substituents derived from tripropylenes.

7. A method as claimed in claim 5, wherein the alkylated diphenyl ether contains alkyl substituents derived from tetrapropylenes.

8. A method as claimed in claim 7, wherein the alkali is sodium hydroxide.

9. A method of making a water-soluble alkyl diphenyl ether sulfonate having surface active properties in aqueous solutions of acids, bases and salts, which method comprises reacting sulfur trioxide with an alkylated diphenyl ether containing an average of from 1 to 1.3 alkyl substituents, each corresponding to a $-C_{12}H_{25}$ radical derived from tetrapropylenes, on aromatic nuclei thereof, per diphenyl ether nucleus, in amounts corresponding to from 1.8 to 2.3 gram molecular proportions of the sulfur trioxide per gram moleculer proportion of the alkylated diphenyl ether, while having the reactants dissolved in methylene chloride in a total concentration of the reactants of from 2 to 20 percent by weight of the solution and at reaction temperatures between −20° and 40° C., neutralizing the resulting alkyl diphenyl ether sulfonic acid with sodium hydroxide to form a corresponding alkyl diphenyl ether sulfonate and separating the sulfonate from the methylene chloride reaction medium.

10. A method of making a water-soluble alkyl diphenyl ether sulfonate, which comprises feeding sulfur trioxide and an alkylated diphenyl ether containing an average of from 1 to 1.3 alkyl substituents, each corresponding to an alkyl radical containing from 9 to 15 carbon atoms and derived from polypropylenes, on aromatic nuclei per diphenyl ether nucleus, into admixture with one another in liquid methylene chloride in a reaction zone in amounts corresponding to from 1.8 to 2.3 gram molecular proportions of the sulfur trioxide per gram molecular proportion of the alkyl diphenyl ether and in a total concentration of the reactants corresponding to from 2 to 20 percent, based on the combined weight of the reactants and the methylene chloride, maintaining the mixture at reaction temperatures between —20° and 40° C. for a period of from 2 to 900 seconds, then withdrawing the reacted mixture from said reaction zone, neutralizing the alkyl diphenyl ether sulfonic acid with sodium hydroxide to form a corresponding alkyl diphenyl ether sulfonate and separating said sulfonate from the methylene chloride.

References Cited in the file of this patent

UNITED STATES PATENTS

| | | |
|---|---|---|
| 2,081,876 | Prahl | May 25, 1937 |
| 2,170,809 | Coleman et al. | Aug. 29, 1939 |
| 2,555,370 | Prutton | June 5, 1951 |